(12) United States Patent
Stewart

(10) Patent No.: US 11,750,585 B2
(45) Date of Patent: Sep. 5, 2023

(54) SECURE EPHEMERAL ACCESS TO INSECURE DEVICES

(71) Applicant: ACUMERA, INC., Austin, TX (US)

(72) Inventor: Brett B. Stewart, Austin, TX (US)

(73) Assignee: Acumera, Inc., Austin, TX (US)

( * ) Notice: Subject to any disclaimer, the term of this patent is extended or adjusted under 35 U.S.C. 154(b) by 244 days.

(21) Appl. No.: 17/017,388

(22) Filed: Sep. 10, 2020

(65) Prior Publication Data

US 2021/0099435 A1   Apr. 1, 2021

Related U.S. Application Data

(60) Provisional application No. 62/908,022, filed on Sep. 30, 2019.

(51) Int. Cl.
| | |
|---|---|
| *H04L 9/40* | (2022.01) |
| *H04L 67/143* | (2022.01) |
| *H04L 12/66* | (2006.01) |
| *H04L 69/28* | (2022.01) |
| *H04L 61/25* | (2022.01) |
| *H04L 67/141* | (2022.01) |

(52) U.S. Cl.
CPC .............. *H04L 63/08* (2013.01); *H04L 12/66* (2013.01); *H04L 61/25* (2013.01); *H04L 67/141* (2013.01); *H04L 67/143* (2013.01); *H04L 69/28* (2013.01)

(58) Field of Classification Search
CPC ......... H04L 63/08; H04L 12/66; H04L 61/25; H04L 67/141; H04L 67/143; H04L 69/28
See application file for complete search history.

(56) References Cited

U.S. PATENT DOCUMENTS

| | | | |
|---|---|---|---|
| 5,950,437 | A | 9/1999 | Turner et al. |
| 6,089,146 | A | 7/2000 | Nam et al. |
| 6,225,908 | B1 | 5/2001 | Lee et al. |
| 6,555,789 | B2 | 4/2003 | Owens et al. |
| 6,859,745 | B2 | 2/2005 | Carr et al. |
| 6,970,100 | B2 | 11/2005 | Lovegreen et al. |
| 7,034,689 | B2 | 4/2006 | Teplitxky et al. |
| 7,551,071 | B2 | 6/2009 | Bennett, III et al. |
| 7,694,005 | B2 | 4/2010 | Reckamp et al. |
| 7,724,154 | B2 | 5/2010 | Stewart et al. |

(Continued)

OTHER PUBLICATIONS

U.S. Appl. No. 12/425,870, filed Apr. 17, 2009, inventors Brett B. Stewart and Charles D. Golson.

*Primary Examiner* — Patrice L Winder
*Assistant Examiner* — Angela M Widhalm De Rodriguez
(74) *Attorney, Agent, or Firm* — Kowert, Hood, Munyon, Rankin & Goetzel, P.C.

(57) ABSTRACT

Embodiments are described for establishing a connection between a premise device and a remote user. A security message may be received from an authentication server. The security message may include an origination address of a request from an authenticated remote user. Connections may be allowed from the origination address of the authenticated remote user with the premise device. A timer may be started which counts an amount of time that the connections are allowed. Forwarding may be enabled of connection data between the premise device and the remote user. An acknowledgement message may be sent to the authentication server indicating completion of preparation of the remote access.

20 Claims, 6 Drawing Sheets

(56) References Cited

U.S. PATENT DOCUMENTS

| | | |
|---|---|---|
| 8,099,332 B2 | 1/2012 | Lemay et al. |
| 8,166,106 B2 | 4/2012 | Biggs et al. |
| 8,190,275 B2 | 5/2012 | Chang |
| 8,205,240 B2 | 6/2012 | Ansari et al. |
| 8,219,558 B1 | 7/2012 | Trandal et al. |
| 8,234,692 B2 | 7/2012 | Cortes et al. |
| 8,239,772 B2 | 8/2012 | Fujioka et al. |
| 8,301,270 B2 | 10/2012 | Quail |
| 8,516,477 B1 | 8/2013 | Kearns et al. |
| 8,782,637 B2 | 7/2014 | Khalid |
| 9,998,287 B2 | 6/2018 | Lee |
| 2002/0040564 A1 | 4/2002 | Killingbeck et al. |
| 2005/0248455 A1 | 11/2005 | Pope et al. |
| 2005/0258961 A1 | 11/2005 | Kimball et al. |
| 2006/0033630 A1 | 2/2006 | Lyall |
| 2006/0089965 A1 | 4/2006 | Fontes et al. |
| 2006/0122852 A1 | 6/2006 | Moudy |
| 2006/0164239 A1 | 7/2006 | Loda |
| 2006/0214788 A1 | 9/2006 | Ku et al. |
| 2009/0019535 A1 | 1/2009 | Mishra et al. |
| 2009/0138958 A1 | 5/2009 | Baum et al. |
| 2009/0168787 A1 | 7/2009 | Ansari et al. |
| 2010/0023865 A1 | 1/2010 | Fulker et al. |
| 2010/0058319 A1 | 3/2010 | Kawaguchi et al. |
| 2010/0202450 A1 | 8/2010 | Ansari et al. |
| 2010/0245107 A1 | 9/2010 | Fulker et al. |
| 2011/0126255 A1 | 5/2011 | Perlman et al. |
| 2011/0251992 A1 | 10/2011 | Bethlehem et al. |
| 2014/0282999 A1 | 9/2014 | Iwanski et al. |
| 2014/0337960 A1 | 11/2014 | Phegade et al. |
| 2015/0003423 A1* | 1/2015 | Wootton ............... H04L 63/029 370/336 |
| 2015/0113617 A1 | 4/2015 | Chastain et al. |
| 2015/0295713 A1 | 10/2015 | Oxford |
| 2016/0057110 A1 | 2/2016 | Li et al. |
| 2016/0261414 A1 | 9/2016 | Lee |
| 2016/0285858 A1 | 9/2016 | Li et al. |
| 2016/0295404 A1 | 10/2016 | Gouget et al. |
| 2019/0058690 A1* | 2/2019 | Huang ............... H04L 61/2517 |
| 2019/0253255 A1 | 8/2019 | Mani et al. |
| 2019/0306161 A1 | 10/2019 | Brand et al. |
| 2019/0327092 A1 | 10/2019 | Kareti |
| 2020/0195630 A1 | 6/2020 | Mallinson et al. |
| 2020/0213119 A1 | 7/2020 | Schat |

* cited by examiner

SECURE EPHEMERAL ACCESS TO INSECURE DEVICES

PRIORITY INFORMATION

This application claims benefit of priority of U.S. provisional application Ser. No. 62/908,022 titled "Secure Ephemeral Access to Insecure Devices" filed Sep. 30, 2019, whose inventor was Brett B. Stewart, which is hereby incorporated by reference in its entirety as though fully and completely set forth herein.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

FIELD OF THE INVENTION

The present invention generally relates to remote access to network devices, and more specifically to systems and methods for establishing secure access to devices at various locations.

DESCRIPTION OF THE RELATED ART

There are a large number of useful electronic devices attached to networks at retail and other premises. For example, merchants, such as gas stations or convenience stores, often have to manage or monitor many different premise devices (devices at a location or premises) in order to properly operate. As one example, a gas station may use several refrigeration units, point of sale (POS) devices, food or drink dispensing machines, electronic signs, outdoor payment terminals, fuel tank monitors, etc. It may be difficult for employees or managers of the gas station to perform their day to day activities as well as monitor the status of all of these different premise devices. For example, the temperature of many convenience store refrigeration units may exceed safe or desirable temperatures for food items stored in the refrigeration units, especially ones that can easily spoil. Further, other than spot checking these conditions or devices, a manager of many stores often has difficulty verifying that store managers are properly monitoring or maintaining all of these premise devices. Similar problems exist for different types of merchants, including department stores, retail stores, grocery stores, quick-serve and fast casual restaurants, etc. Additionally, these problems can also be extended to users in their own home, e.g., for managing various computer devices, refrigerators, lights, swimming pools, HVAC equipment, entertainment equipment, plug in automobiles, solar power generation equipment, power meters, etc.

In order to properly monitor these devices, often it is desired for these devices to be accessed and monitored from a remote location. Thus these devices are often attached to those premise networks in a way that allows them to initiate connections via the Internet, to other devices or services located away from the premises. The owners or users of these devices may then find it useful to access them from a location distant to the premises where the devices are connected.

However, these devices vary widely in their intrinsic security and ability to prevent misuse when remotely accessed. Security best practice would be to prohibit any connections from remote locations to these devices, especially if these devices have a weak or unknown security reputation. FIG. 1 illustrates an example of this type of system, where all connections are blocked by a conventional firewall, and no remote connections are possible. FIG. 2 shows a system with a conventional firewall configured to allow remote connections from any address, which is very insecure. It is widely viewed as an insecure practice to enable on-premise devices to connect to any distant location, or to allow connections from any distant location to an on-premise device. FIG. 3 shows a system involving a conventional firewall where a remote access user at a fixed location and/or fixed address is able to access the legacy insecure device via a conventional firewall that is configured to allow the fixed location and/or fixed address access to the local network. However, this solution does not allow for dynamic access of users from different locations and/or different addresses in a secure manner.

Another method for enabling the owners or users to have secure remote access is to require that the owner/user first connect to access an intermediary network server ("cloud service") via a secure means, which server then forwards the connection to the device on the distant premises, thereby enabling remote access. Clearly this method requires that the premise device co-operate with the network server, and this method of operation has to be anticipated, or designed into the premise device in advance. However, there are many useful electronic devices that did not anticipate this sort of security via an intermediary at the time of their origination. One example of such a device is a digital video recorder. There are many thousands of digital video recorders in service, for the purpose of providing premise security and loss prevention. These digital video recorders are often intended to be remotely accessed, and their owners have enabled network access to these devices from any distant location, despite the insecurity of the devices and the publication of numerous data breaches arising from the breach of insecure devices that have enabled remote network access.

An additional disadvantage of this method is that, at a minimum, the on-premise device must be allowed by the firewall to access the intermediary network server. Often the trustworthiness of the intermediary server is unknown. There is a history of security failure when either of the foregoing methods are employed. In these security failures, unknown and unscrupulous third parties have succeeded in subverting the security features used in both of these methods to gain access to the premise networks, and to cause losses to the owners of the premises and premise networks.

The worst situation that is commonly occurring is the situation where a device is useful, but no considerations of best network security practices were made when the device originated. These intrinsically insecure devices are widespread.

Accordingly, improvements in securely accessing these types of devices are desired.

SUMMARY OF THE INVENTION

Various embodiments are described of a system and method for establishing secure access to premise devices at various locations (e.g., merchant locations), using gateway devices.

Embodiments of the invention may provide a much more secure powerful mechanism for enabling merchants to remotely access the various premise devices in their store. For example, by providing secure access to the premise devices at the location, a user may be able to safely monitor and/or control the environment at the location (e.g., temperature, security, lighting, music, etc.).

BRIEF DESCRIPTION OF THE DRAWINGS

A better understanding of the present invention may be obtained when the following detailed description is considered in conjunction with the following drawings, in which.

Figure 1:
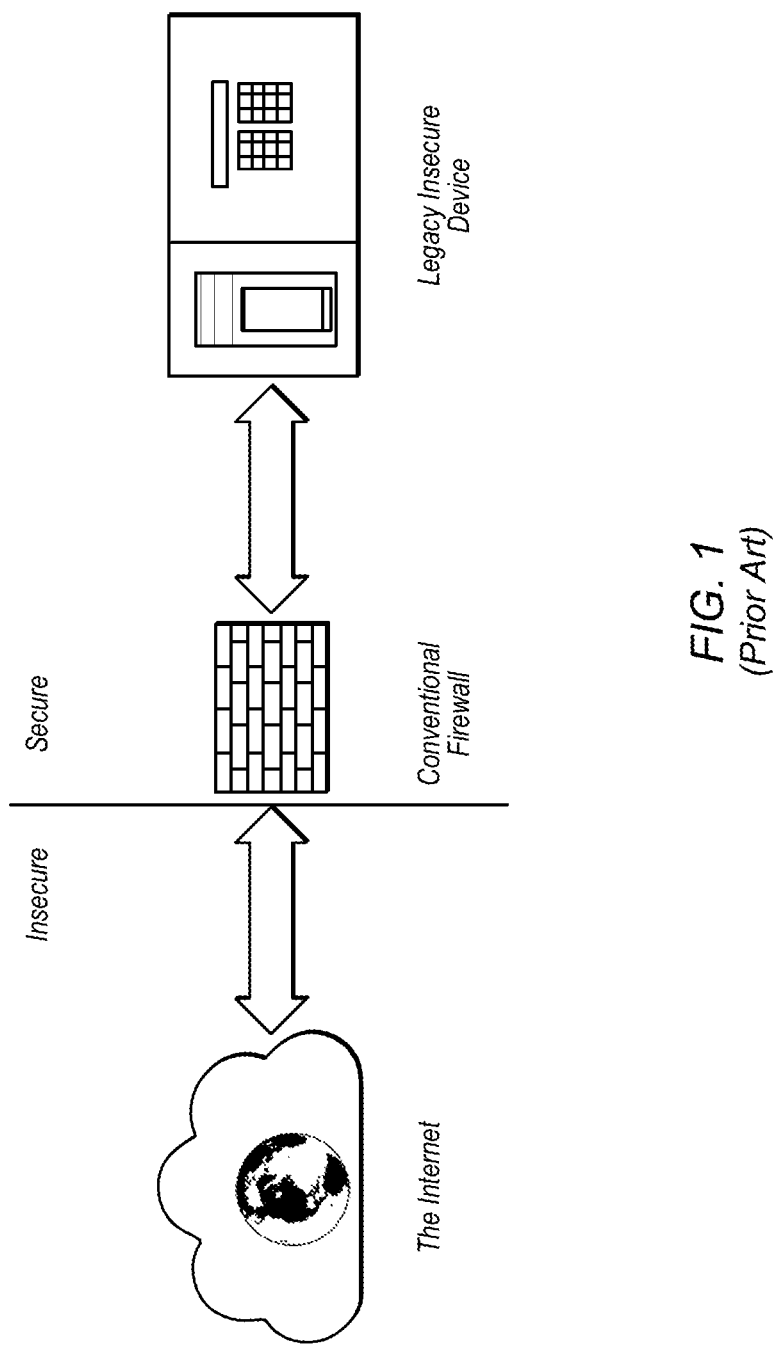
FIG. 1 illustrates a prior art system where a conventional firewall blocks all connections.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

U.S. Pat. No. 10,187,494 titled "Gateway Device Application Development System", which was filed Apr. 19, 2012 and which issued on Jan. 22, 2019, whose inventors were Brett B. Stewart, Dirk D. Heinen, and Margo A. Baxter, is hereby incorporated by reference in its entirety as though fully and completely set forth herein.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Gateway Device—refers to a device that is configured to couple to a wide area network, such as the Internet, and also couple (either wired or wirelessly) to one or more devices, and which is configurable with one or more application programs to monitor and/or control the one or more devices. The term "Merchant Gateway Device" refers to a Gateway Device that is configured to be placed at a merchant location, e.g., which is configurable with one or more application programs to monitor and/or control one or more devices that would typically be located at a merchant location.

Figure 4:
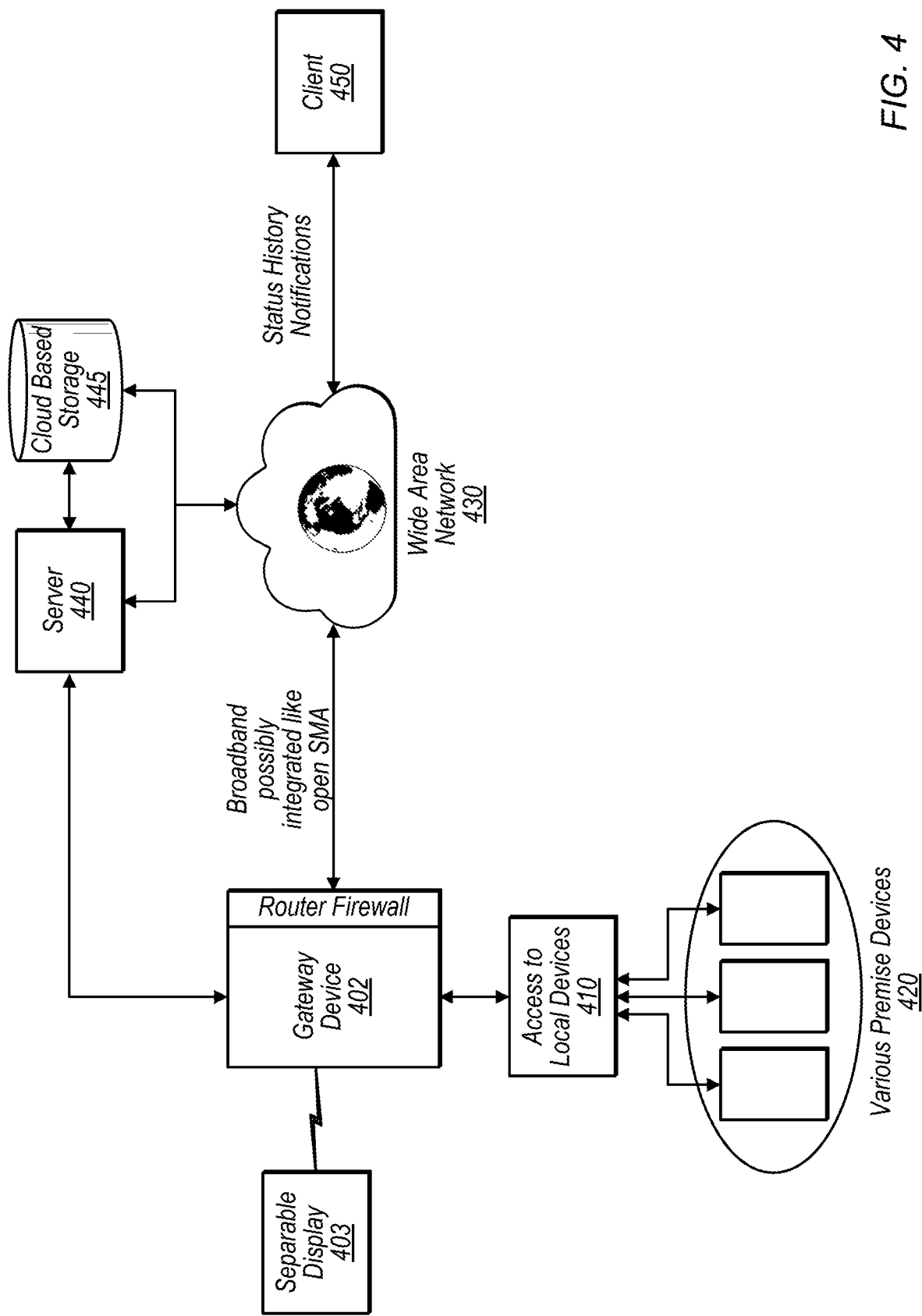
FIG. 4 illustrates a system which provides ephemeral secure access to devices, according to some embodiments.

FIG. 4—Exemplary System

FIG. 4 illustrates an exemplary system that may implement embodiments described herein. However, the system of FIG. 4 is exemplary only and other systems and configurations are envisioned. For example, any desired type of device (e.g., other than a gateway device described below) may be configured to implement various embodiments described herein.

In FIG. 4, an exemplary location (e.g., a merchant location, such as a store) is illustrated. The location includes a gateway device 402, which may manage the network connection to and from various premise devices of the store. The gateway device 402 may include a built-in display or may have a separable display 403. In some embodiments, the separable display 403 may be simply a display device or it may be another system (e.g., a computer or smart device) that includes a display and is able to access the gateway device 402. The separable display 403 may be on the same premises as the gateway device 403 or in a different location, as desired.

As shown, the gateway device may be coupled (in a wired or wireless fashion via the access to local devices 410, such as through a wired or wireless local area network) to various premise devices 420 in the location. The gateway device 402 may be installed at the location in a relatively straightforward manner. For example, the gateway device 402 may simply be screwed into the wall and connected to a local Internet connection or network connection. In some embodiments, the gateway device 402 may be a ruggedized device and may be stored in an electrical closet.

In one embodiment, the gateway device 402 may include security software or circuitry, e.g., to provide a firewall for the Internet connection, perform communication encryption, protect credit card information provided over the network connection, etc. In further embodiments, the gateway device may provide a local area network (LAN) that at least a subset of the premise devices may connect to, e.g., in order to communicate with the gateway device and/or the Internet. For example, access to local devices 410 may be included as part of the gateway device 402. Similarly, the gateway device 402 may provide a wireless hotspot for the convenience store, e.g., which may be accessible by employees of the convenience store and/or customers of the convenience store, as desired.

The various premise devices 420 to which the gateway device 402 may be coupled may include: one or more point of sale devices (POSs, such as credit card readers for purchasing fuel, e.g., located at the pump, or items sold by the convenience store, e.g., located in the store), one or more liquid dispensing devices (e.g., a Slurpee™ machine, coffee dispenser, fountain drink dispenser, etc.), one or more refrigeration devices (e.g., for cooling various food or drink items), or one or more fuel tank devices (e.g., for monitoring the level of fuel in the tank, dispensing the fuel to customers, etc.). The gateway device 402 may manage other premise devices than those shown in FIG. 4; for example, the gateway device may manage vending machines (e.g., for food items or other types of items, such as movies, devices, peripherals, etc.), heating devices (e.g., for keeping food items hot, such as hot dogs), washing devices (e.g., car washes or laundry machines), electronic signs (e.g., advertising the price of the gas at the convenience store, among other possibilities), ATM machines, air conditioning units or heating units of the convenience store, store security devices/systems (e.g., cameras or alarm systems, etc.), ice machines, soft serve dispensing machines, cash registers, safes, any local computers or servers, the local area network of the convenience store, any network connection(s) (e.g., the Internet) of the convenience store, wireless network(s), etc.

As described in U.S. Pat. No. 10,187,494, the gateway device 402 may monitor or control these various premise devices. For example, the gateway device 402 may monitor and/or control the temperature inside or near a refrigeration device. As another example, the gateway device 402 may manage a fuel tank device. For example, the fuel tank device (or a sensor within the fuel tank) may provide reported information, such as readings indicating the level of fuel stored in the fuel tank. The gateway device 402 may monitor the status of the liquid dispensing device. For example, the gateway device may monitor the status of various nozzles that dispense different liquids, the status of the level of ice in the liquid dispensing device, the temperature of the liquid stored in or provided by the liquid dispensing device, the level of liquid stored in the liquid dispensing device, etc. Again, as noted above, the gateway device 402 may monitor one or more sensors coupled to the liquid dispensing device to accomplish the above functions. Additionally, the gateway device 402 may manage various POS devices at the convenience store. For example, the gateway device 402 may monitor or control POS devices that are at the gas pump(s) of the convenience store, POS devices at a cash register of the convenience store, etc. The gateway device 402 may monitor transactions that are performed by the POS devices. Thus, the gateway device 402 may manage any type of device that it is coupled to.

As shown, the gateway device 402 may be in communication with a network, e.g., a wide area network (WAN), such as the Internet, 430. The gateway device 402 may be in communication with the WAN 430 via a router or modem that provides the WAN (e.g., Internet) connection. Alternatively, the gateway device 402 may itself include logic (e.g., circuitry such as an ASIC or FPGA and/or a processor and memory storing program instructions) to perform these wide area network connectivity functions. For example, the gateway device 402 may include a broadband modem for providing a communication link between the location and the Internet. The gateway device 402 may also act as a router (e.g., a wired and/or wireless router) which couples to the WAN 430 and premise devices at the location.

As also shown, the gateway device 402 may be in communication with a computer system (e.g., display 403) in the convenience store (e.g., in a wired or wireless fashion, as desired). For example, a manager or employee of the convenience store may use the computer system to perform various tasks related to the convenience store, e.g., viewing security feeds, performing bookkeeping, etc. In some embodiments, the gateway device may be configured to manage the computer system. In one embodiment, the gateway device may monitor various programs that are executing on the computer system and/or the Internet traffic that the computer system is receiving or transmitting, among other possibilities.

Alternatively, or additionally, the computer system in the convenience store may be used to manage or monitor the various programs executing on the gateway device 402. For example, the gateway device 402 may provide status messages (e.g., containing reported information) or control messages (e.g., for controlling one or more devices) regarding the plurality of devices 420 of the location to the computer system. For example, an employee or manager of the location (e.g., the store) may monitor or control the various devices of the location using an application that executes on the computer system and which is in communication with the gateway device 402. For example, the gateway device 402 may include a web server that hosts a website used for these monitor/control functions. The computer system may execute a web browser and may visit the website (e.g., hosted by the gateway device or elsewhere) that is usable to manage the devices at the convenience store. Alternatively, a custom application may be executed by the computer system to manage the devices 420 via the gateway device 402. Note that while the separable display 403 is described as computer system (e.g., a desktop computer system), any type of system may be used, e.g., laptop computers, portable or mobile devices, such as cell phones, netbook computers, tablet computers, etc. In general, in this embodiment, the separable display 403 may be any device that is able to provide an interface to the gateway device for a user. For example, it may simply be a separate display that is able to display information provided by the gateway device (e.g., over a wireless network).

The computer system may be in communication with a server 440, which may be referred to as a management server (e.g., a cloud server, as described below). The management server 440 may be connected via the WAN 430, or may be in direct communication with the gateway device (e.g., without accessing the WAN 430), and/or both, as desired. The gateway device 402 may be in direct communication with the management server 440 to report information gathered by the devices or perform control actions, among other possibilities. A user may be able to configure the gateway device 402 directly (e.g., via a web site hosted by the gateway device or via an application executing on the computer system) or may be able to configure the gateway device over the WAN 430, via the management server 440.

As shown in FIG. 4 (and as discussed above), the gateway device 402 may be in communication with one or more servers 440 (e.g., which may be a single server or a server farm, as desired) over the WAN 430. The one or more servers 440 (which may be a "cloud server" or "cloud servers") may provide various functionality for the location (e.g., the store), the gateway device, and/or other devices or users, as desired.

For example, the management server 440 may be configured to receive and store information regarding the premise devices 420 managed by the gateway device and possibly status information of the gateway device 402 or the location. The management server 440 may store data (e.g., the received information discussed herein, among other information) in cloud base storage 445. In one embodiment, the management server 440 may store configuration information of the various premise devices 420, network status information of the connection between the management server 440 and the gateway device 402, etc. In one embodiment, the management server 440 may be configured to receive messages comprising information gathered from each of (or at least a subset of) the plurality of premise devices 420 at the location and location-reported information for the premise devices 420, e.g., in a database. The reported information may indicate a current condition of the premise device, a condition of the environment of the location near the premise device, any data measured by the premise device, etc. For example, the management server 440 may store the current temperature (and/or a history of temperatures) for a first refrigeration device at the location. The management server 440 may also receive messages regarding various transactions performed by a first POS device at the location and store information regarding those transactions. The management server 440 may also receive messages regarding the fuel level in a first fuel tank at the location and store the current level (or a history of fuel levels) in response to the message. Other types of reported information or messages may be received by the management server.

In some embodiments, the management server 440 may receive messages indicating specific alarms or events associated with the premise devices managed by the gateway device. For example, the gateway device 402 may send information indicating when a temperature of the refrigeration device exceeds a threshold (e.g., based on food safety requirements or otherwise); when the fuel level in the fuel tank is below a threshold level; when the liquid dispensing device is low on a respective liquid, out of ice, etc.; when the POS performs or attempts to perform a transaction above a certain level, etc. The gateway device 402 may also send information when a security alarm has been detected (e.g., when the convenience store is broken in to), when an employee triggers an alarm (e.g., when the convenience store is being robbed), etc.

In one embodiment, rather than the management server 440 receiving indications of a specific alarm, the management server 440 may be configured to automatically evaluate the incoming reported information to determine whether such conditions have arisen. For example, rather than receiving a message indicating that the fuel tank is below a certain level, the management server 440 may be configured to compare the current fuel tank level (e.g., as reported in a status message) with a threshold to determine if the fuel tank has reached a refueling level. Similarly, the management server 440 may be configured to compare a current temperature of a refrigerator with a threshold temperature to determine if the refrigerator is operating adequately and/or if the temperature is above food safety levels.

Note that while the reported information is provided to the management server 440 by the gateway device 402, other entities or devices may provide reported information related to the location (e.g., a store) to the management server 440. For example, a third party server may provide information related to a device located at the location of the gateway device 402 to the management server 440, and the management server 440 may receive that data and report it for the location of the gateway device 402 (e.g., as if it were provided from the gateway device 402). As one specific example, an energy company may store information related to the energy consumption of the location, but that information may not be available to the gateway device 402 (e.g., by being coupled to a smart sensor that monitors energy use of the location). Accordingly, a server storing that energy information may be configured to provide the information to the management server 440, which can then include that information in an interface to a user. Thus, a user may be able to view the energy use information from the management server 440 even though it was not provided via the gateway device 402. Accordingly, the management server 440 may be configured to aggregate information concerning a location from a plurality of sources, including the gateway device 402 and/or other entities that gather or store such data. As another example, a manufacturer of a device may send reported information (or alerts) based on schedules. For example, an ice machine manufacturer may send information to the management server to update the status to "replace filter" every on a periodic basis (e.g., every six months). This may be extended to any party or particular information related to the location (e.g., a device at the location). Further, weather information related to the location may be provided to the management server (e.g., from a weather service).

The management server 440 may also be configured to provide information related to the location to various users, entities, and/or devices (e.g., user devices). For example, the management server 440 may receive information gathered by the various premise devices 420 and may provide the information for display to client 450, e.g., on a website that may be visited by authorized users (e.g., users that are associated with the specific convenience store). Alternatively, or additionally, these users (or other devices) may execute programs on computer systems or devices designed to interface with the management server 440 to retrieve and provide the information for presentation for the user. In one embodiment, a manager of the location may be able to execute such a program or browse to a web site provided by the management server 440, to view the current status of the location, e.g., as reported by the various premise devices 420. For example, the manager may be able to quickly determine the fuel level in the fuel tanks of a convenience store, determine whether the food sold at the convenience store are currently at proper temperatures (and/or if they have been over a period of time, such as the last day, last week, last month, or any period of time specified by the user), determine the current prices of the gas sold by the convenience store, determine the number or amount of sales performed by the convenience store over various time periods (such as those described above, although they can be specified manually by the user), etc.

Note that the computer system (e.g., 403) inside of the location may similarly access the management server 440 (or the gateway device 402) to determine the status of the convenience store (e.g., based on the reported information), as desired. Thus, the gateway device 402 may monitor the status or condition of various premise devices 420 in the location (or generally various conditions within the location, e.g., as reported by premise devices 420), provide them to the management server 440, and the management server 440 may provide that information to various other entities or users, which may be local or remote to the location, as desired. Alternatively, the gateway device 402 may include web server functionality, and thus the gateway device may be accessible by client browsers located on the computer system or the management server 440.

Method for Ephemeral Secure Remote Access to Intrinsically Insecure Devices

Embodiments described herein are directed to the provision of a remote access connection to intrinsically insecure devices at a premise (e.g., such as at a merchant or retailer). An "intrinsically insecure device" (which may be referred to as an "insecure device") may be any device that does not perform desired security functions (e.g., authentication, authorization or any functions to block unauthorized access, etc.) for access of the device. For an example of an intrinsically insecure device, consider a common practice where devices and services desire and/or require that users wishing to access them tender more than one form of authentication credential, such as a password and a one-time numerical code, in order to thwart access to malefactors who may have stolen only one form of such authentication credentials. That second access credential might be a code generated by an algorithm on a separate mobile computing device, or sent by text message to a mobile phone. Any device that, at time of its manufacture, did not support the requirement for multi-credential authentication, perhaps relying on a single simple password, might then be considered intrinsically insecure because it lacks a desired authentication method of multi-credential authentication. In the description the intrinsically insecure device may be referred to simply as a device.

Figure 2:
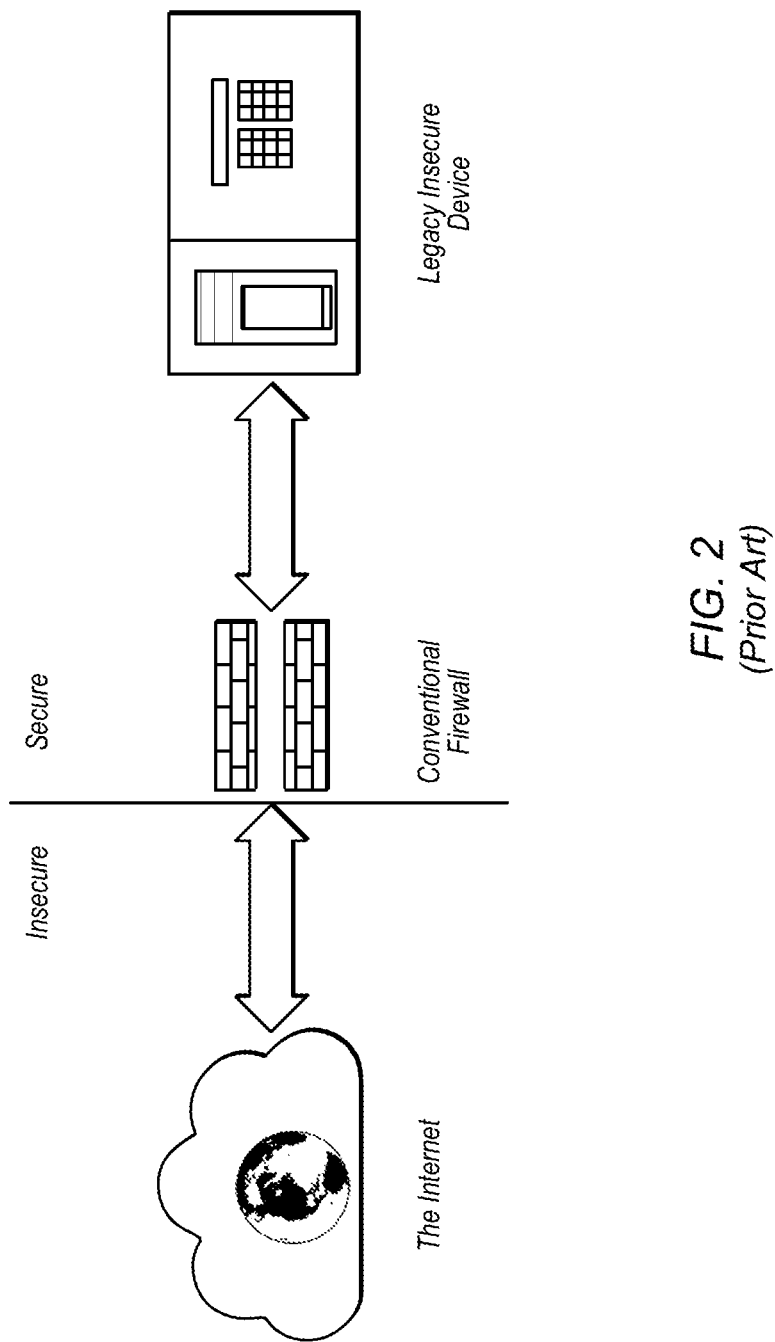
FIG. 2 illustrates a prior art system where a conventional firewall is configured to allow access from any connection.
Figure 3:
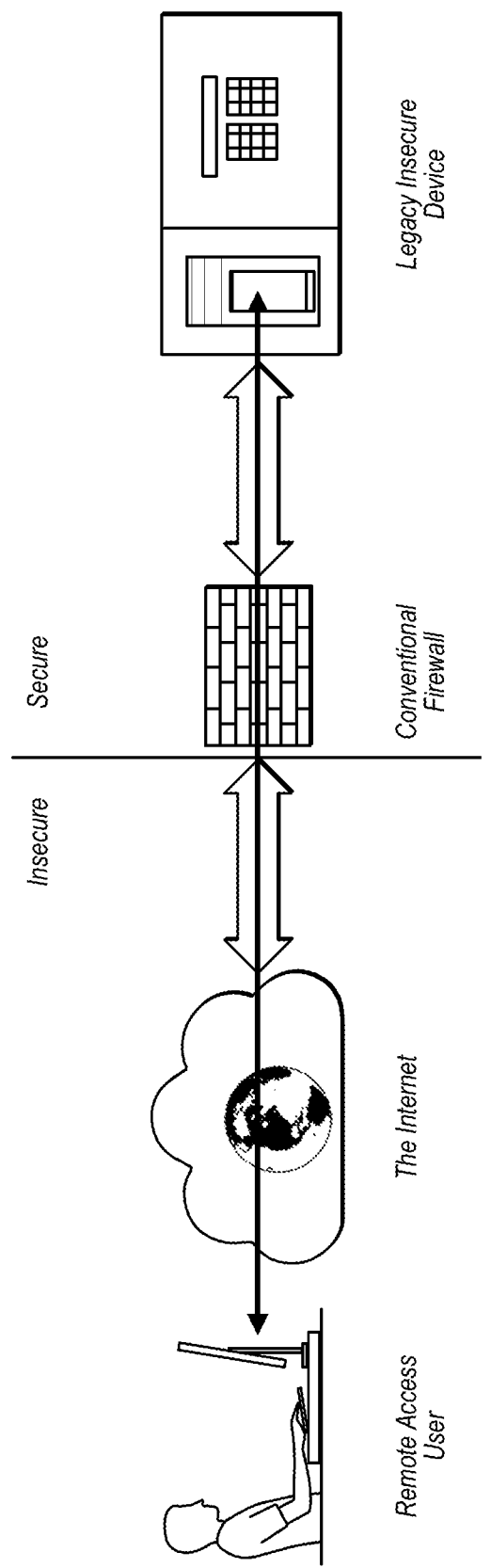
FIG. 3 illustrates a system which employs an intermediary network server or cloud service to provide security.

Embodiments described herein provide secure remote access to the device via strong authentication of remote users, coupled with ephemerality of the connection from the location and isolation of the premise device. The method may include replacement of a conventional firewall (e.g., such as shown in FIGS. 1-3) with a security device capable of performing various embodiments described herein, e.g., as well as all functions of a conventional firewall. In exemplary embodiments described herein, the security device may be a gateway device, such as the gateway device 402.

In some embodiments, the method may also include an authentication server. This authentication server can impose authentication methods independent of the characteristics of any particular premise device for which remote access is to be securely enabled.

Figure 5:
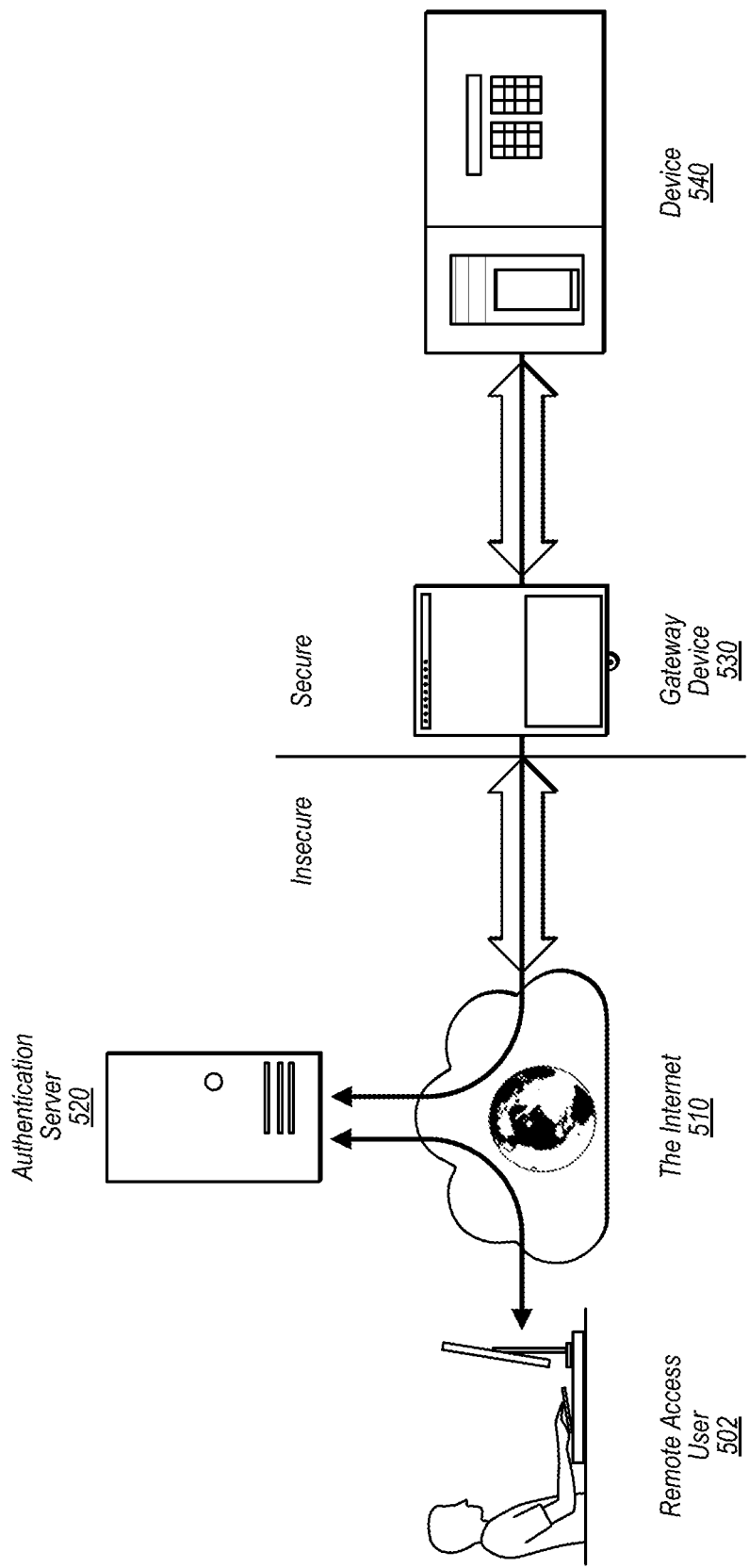
FIG. 5 illustrates a more simplified block diagram of the system of FIG. 4 showing connectivity, according to some embodiments.
Figure 6:
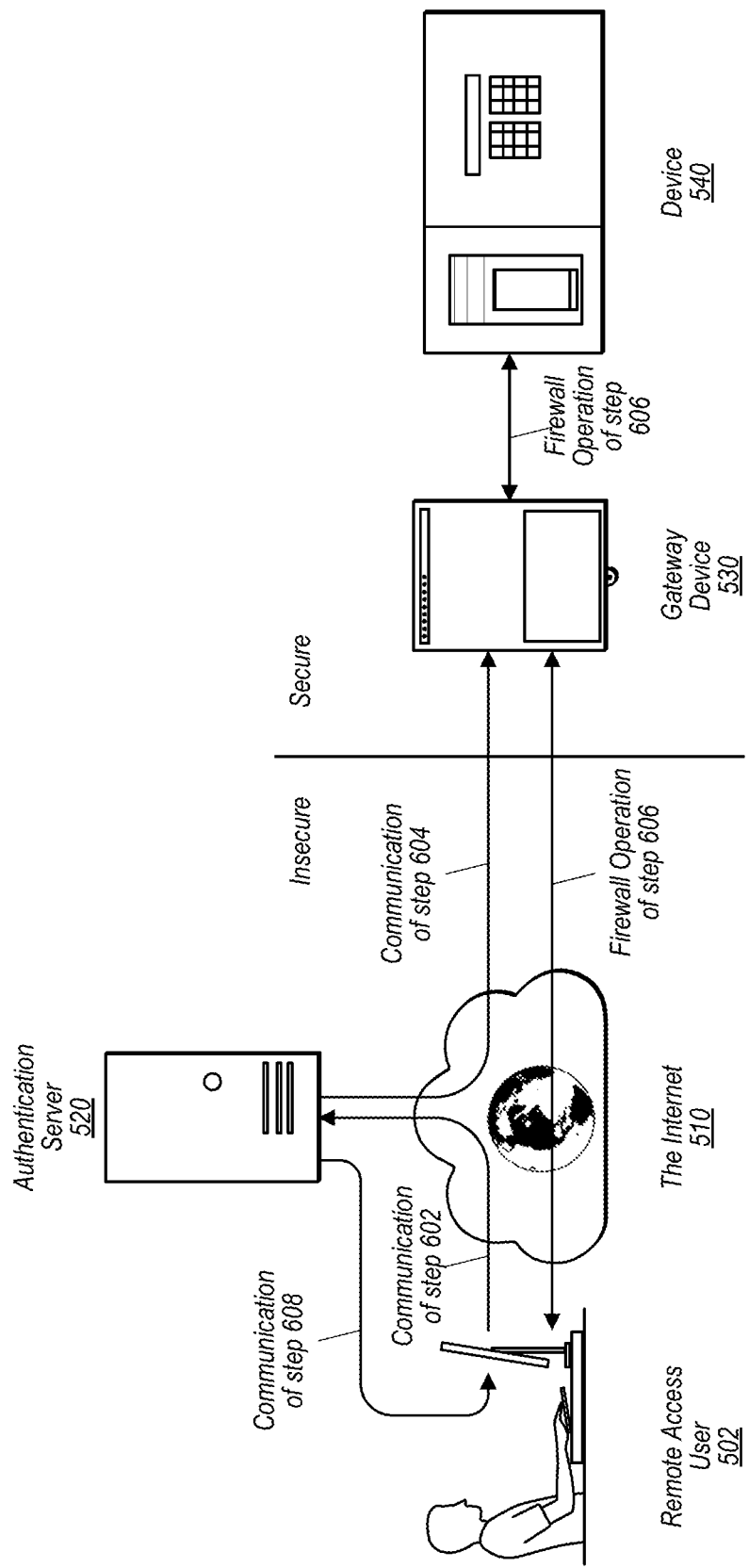
FIG. 6 illustrates flow of operations in the diagram of FIG. 5, according to some embodiments.

FIGS. 5 and 6 illustrate an exemplary system and method to initiate and perform a connection with improved security.

As shown, FIG. 5 illustrates a remote access user 502, which is coupled to the authentication server 520 via a wide area network (e.g., the Internet 510). The gateway device 530 is coupled to the authentication server 520 via the wide area network (e.g., the Internet 510) and may provide security to the device 540. Thus, access to one or more devices at the location (e.g., including device 540) may be controlled by the gateway device 530, which is in communication with authentication server 520. FIG. 6 illustrates flow of communication among the various device using the exemplary system of FIG. 5. As shown, the method may include the following steps (noting that the steps may be modified, replaced, omitted, or reordered, as desired).

At 602, a remote user 502 may authenticate with an authentication server 520. In some embodiments, the authentication server 520 may not act as an intermediary between the user 502 and the device 540 after authentication. During this authentication, the origination network address of the remote user may be determined. Various user authentication methods can be employed because the process of authentication is no longer connected to the manufacture or characteristics of the device 540 on the premises. For example, the user authentication may include a unique user name and password, uses two factor authentication (e.g., using a FOB, texting a cell phone of the user, using an application that provides a code refreshes periodically on a frequent basis, etc.), or any number of other methods for authenticating a user.

Note that the authentication of the user may be for different levels of access within the network at the premises. For example, the user may request access to full access to the network at the premises, e.g., so that the user may be able to interact with any device coupled to the gateway device 530 at the premises. This full level of access may be similar to that of a virtual private network (VPN) connection. However, the user may request (or only be allowed) limited access to the network and/or devices at the premises. For example, the remote user 502 may be a technician that is attempting to access/repair/update/upgrade a specific device or type of device at the premises, such as a credit card machine. Accordingly, the authentication may be performed for only accessing that device or that type of device. In general, any level of access may be provided that is desired, e.g., a single device, a plurality of devices (such as of the same type), a plurality of specific devices, all devices, etc.

In some embodiments, the level of access may be requested and/or established as part of the authentication procedure. For example, the authentication process of 602 may involve the remote user 502 providing an indication of the device or set of devices the user wishes to access and the authentication server 520 may determine which of the requested devices will be accessible, which may be indicated back to the remote user 502. Alternatively, or additionally, the remote user 502 may have a preconfigured set of devices that are allowed for that user. In other words, the authentication procedure may only be to establish the identity of the remote user 502 and the authentication server 520 and/or gateway device 530 may already store information that indicates which level of access or which set of device(s) that user is authorized to access.

As part of the authentication procedure, the authentication server 520 may determine or receive the origination address (e.g., an IP address) of the remote user 502. The origination address may be provided in a message from the remote user 502. Alternatively, or additionally, the authentication server 520 may determine the origination address based on messages received from the remote user 502.

At 604, in response to authentication of the user 502, the authentication server 520 may send one or more secure messages to a security device (shown as gateway device 530) at the premises. As noted above, the gateway device 530 may provide firewall functionality as well as other functions that allow the presently described embodiments to be implemented.

In some embodiments, the one or more messages between the authentication server 520 and the gateway device 530 in 604 may include the origination address of the request from the authenticated remote user 502.

Additionally, the one or more messages between the authentication server 520 and the gateway device 530 may include an indication of one or more devices that the user 502 is allowed to access. This indication may specify the identities of each of the devices the user is able to access. Alternatively, or additionally, the indication may specify a type of device or set of devices that the user 502 is allowed to access (e.g., all credit card machines, all point of sale devices, etc.). As another possibility, the indication may simply specify a level of access (e.g., full access, partial access, etc.).

In some embodiments, rather than the authentication server 520 specifying the devices or level of access of the user 502 in the one or more messages, the gateway device 530 may store information about the user 502 that associates specific devices with the user 502. This information could be added, modified, or removed at any time, e.g., from the authentication server 520 or another server, as desired. In some embodiments, the gateway device 530 may receive the information specifying the allowed set of devices or level of access from the authentication server 520 such as when a new user is authenticated and may store that information for future reference, e.g., when the user logs in again. Accordingly, the authentication server 520 may only send an indication of access-level (or specified set of devices) only when necessary, e.g., first time authentication or when the access-level changes.

In 606, upon receipt of the secure message in 604, the gateway device 530 may allow connections from the address of the authenticated user 502. The gateway device 530 may not allow connections from addresses that have not been indicated by the authentication server 520. In some embodiments, the gateway device 530 may send an acknowledgement message back to the authentication server 520 indicating completion and/or preparation for the remote access by the remote user 502. For example, an acknowledgement may be provided initially upon receiving initial messages from the authentication server 520. Additionally, or alternatively, the acknowledgement may be provided once the gateway device 530 has completed set up of the allowed access for the remote user 502.

The gateway device 530 may also start a timer (e.g., ephemerality timer) that specifies a time length that the user 502 can access device(s) at the location. For example, the timer may have a length of 10 minutes, 20 minutes, 30 minutes, 1 hour, 2 hours, etc. In some embodiments, the timer may have a shorter duration that is refreshed with activity. For example, the timer may be configured to expire if there is no activity within 1 minutes, 2 minutes, 5 minutes, 10 minutes, etc. Additionally, the timer may also have a maximum duration that, regardless of activity or inactivity, causes the authentication of the user 502 to expire.

While the timer is not expired, the gateway device 530 may enable forwarding of connection data between the authenticated user 502 and one or more devices within the network at the premises. As noted above, the user 502 may have different levels of access, so the gateway device 530 may only allow the authenticated user 502 access to those devices prescribed by the level of access or set of device(s) that the user 502 is allowed to access. The gateway device 530 may not allow any connection between the user 502 and any devices not indicated by the authentication server 520 (or otherwise specified or stored by the gateway device 530). In some embodiments, the gateway device 530 may start a proxy service to secure data exchanged between the user 502 and the device 540 (where the device 540 is one of the one or more devices that the user 502 is allowed to access).

In some embodiments, as part of the relaying of traffic between the user 502 and the device 540 (among other devices that the user 502 may be allowed to access), the gateway device 530 may perform address translation such that any connection from the remote user 502 may appear to originate with the gateway device 530, such that the premise device 540 remains isolated from connections from remote addresses throughout the remote access session. For devices that are configured with functionality to restrict access based on origination address (e.g., or only communication within the local network), this address translation will allow remote access to the device 540.

In 608, upon receipt of a preparation completion or acknowledgement message from the gateway device 530, the authentication server 520 may provide to the authenticated user 502 an indication allowing remote access. In some embodiments, the indication may include a link to initiate remote access. For example, the indication and/or link may include an address of the gateway device 530, so that the user 502 can communicate directly with gateway device 530 (and ultimately to the device 540) without using authentication server 520 as an intermediary. In some embodiments, the authentication server 520 may determine the address of the gateway device 530 during the exchange of messages in 606, although the authentication server 520 may have already stored such information previously.

Accordingly, the user 502 may then communicate with the one or more devices (including device 540) for the length of the remote access session, e.g., via the gateway device 530.

Upon completion of the remote access session, the authenticated user 502 may inform the authentication server 520, which can then send another message to the gateway device 530 indicating completion of the session, e.g., and that all further communications should be disabled. The remote access session may also be ended by the timer described above in an automatic fashion, thus ensuring that the access to the device 540 (or other devices associated with the remote access session) is terminated and does not last for an indefinite period of time, allowing for enhanced security within the network at the premises. Thus, even when the user 502 does not log off or terminate the session manually (or is unable to do so for some reason), the connection may be terminated automatically, e.g., based on the timer.

Although the embodiments above have been described in considerable detail, numerous variations and modifications will become apparent to those skilled in the art once the above disclosure is fully appreciated. For example, while many of the embodiments above are described with respect to a cloud server, simpler embodiments involving a single server are also envisioned. It is intended that the following claims be interpreted to embrace all such variations and modifications.

What is claimed is:

1. A non-transitory computer readable memory medium comprising program instructions for establishing communication between at least one premise device and an authenticated remote user, wherein the program instructions are executable by a security device to:
receive one or more messages from an authentication server to establish a remote access session between a device associated with the authenticated remote user and the at least one premise device coupled to the security device, wherein the one or more messages indicate an origination address of the device associated with the authenticated remote user, wherein the at least one premise device is configured with functionality to restrict access based on the origination address;
in response to receiving the one or more messages from the authentication server, establish communication with the device associated with the authenticated remote user, wherein said establishing communication is performed based on the origination address;
start a timer which counts an amount of time that connections from the device associated with the authenticated remote user are allowed;
at a first time, enable relaying of data between the at least one premise device and the device associated with the authenticated remote user while the timer is active, wherein relaying of data between the at least one premise device and the device associated with the authenticated remote user comprises communicating with the at least one premise device over a local area network and performing address translation such that the connection from the device associated with the authenticated remote user appears to the at least one premise device to originate with the security device; and
at a second time, disable relaying of data between the at least one premise device and the device associated with the authenticated remote user.

2. The non-transitory computer readable memory medium of claim 1, wherein said disabling relaying of data between the at least one premise device and the device associated with the authenticated remote user is performed in response to the authentication server providing a message indicating termination of the remote access session.

3. The non-transitory computer readable memory medium of claim 1, wherein said disabling relaying of data between the at least one premise device and the device associated with the authenticated remote user is performed in response to the timer reaching a threshold value.

4. The non-transitory computer readable memory medium of claim 1, wherein said enabling relaying of data between the at least one premise device and the device associated with the authenticated remote user is limited to only a specified one or more premise devices coupled to the security device.

5. The non-transitory computer readable memory medium of claim 1, wherein the security device is coupled to a plurality of premise devices, wherein the plurality of premise devices includes a second premise device, wherein the second premise device is not included in the at least one device, wherein the security device is configured to prevent access to the second premise device by the device associated with the authenticated remote user.

6. The non-transitory computer readable memory medium of claim 1, wherein the one or more messages indicate the at least one premise device, wherein the security device is configured to prevent access of the device associated with the authenticated user to devices other than the at least one premise device.

7. The non-transitory computer readable memory medium of claim 1, wherein said relaying of data between the at least one premise device and the device associated with the authenticated remote user does not include transmitting data to or receiving data from the authentication server.

8. The non-transitory computer readable memory medium of claim 1,
wherein the one or more messages from the authentication server are received over an internet connection, and
wherein said establishing communication between the at least one premise device and the authenticated remote user is performed over the internet connection.

9. A gateway device, comprising:
communication circuitry for establishing communication between at least one premise device and an authenticated remote user; and
at least one processor coupled to the communication circuitry, wherein the at least one processor is configured to cause the gateway device to:
receive one or more messages from an authentication server to establish a remote access session between a device associated with the authenticated remote user and the at least one premise device coupled to the security device, wherein the one or more messages indicate an origination address of the device associated with the authenticated remote user, wherein the at least one premise device is configured with functionality to restrict access based on the origination address;
in response to receiving the one or more messages from the authentication server, establish communication with the device associated with the authenticated remote user, wherein said establishing communication is performed based on the origination address;
start a timer which counts an amount of time that connections from the device associated with the authenticated remote user are allowed;
at a first time, enable relaying of data between the at least one premise device and the device associated with the authenticated remote user while the timer is active, wherein relaying of data between the at least one premise device and the device associated with the authenticated remote user comprises communicating with the at least one premise device over a local area network and performing address translation such that the connection from the device associated with the authenticated remote user appears to the at least one premise device to originate with the security device; and
at a second time, disable relaying of data between the at least one premise device and the device associated with the authenticated remote user.

10. The gateway device of claim 9, wherein said disabling relaying of data between the at least one premise device and the device associated with the authenticated remote user is performed in response to the authentication server providing a message indicating termination of the remote access session.

11. The gateway device of claim 9, wherein said disabling relaying of data between the at least one premise device and the device associated with the authenticated remote user is performed in response to the timer reaching a threshold value.

12. The gateway device of claim 9, wherein said enabling relaying of data between the at least one premise device and the device associated with the authenticated remote user is limited to only a specified one or more premise devices coupled to the gateway device.

13. The gateway device of claim 9, wherein the gateway device is coupled to a plurality of premise devices, wherein the plurality of premise devices includes a second premise device, wherein the second premise device is not included in the at least one device, wherein the gateway device is configured to prevent access to the second premise device by the device associated with the authenticated remote user.

14. The gateway device of claim 9, wherein the one or more messages indicate the at least one premise device, wherein the gateway device is configured to prevent access of the device associated with the authenticated user to devices other than the at least one premise device.

15. The gateway device of claim 9, wherein said relaying of data between the at least one premise device and the device associated with the authenticated remote user does not include transmitting data to or receiving data from the authentication server.

16. The gateway device of claim 9,
wherein the one or more messages from the authentication server are received over an internet connection, and
wherein said establishing communication between the at least one premise device and the authenticated remote user is performed over the internet connection.

17. A method for establishing communication between at least one premise device and an authenticated remote user, comprising:
by a security device:
receiving one or more messages from an authentication server to establish a remote access session between a device associated with the authenticated remote user and the at least one premise device coupled to the security device, wherein the one or more messages indicate an origination address of the device associated with the authenticated remote user, wherein the at least one premise device is configured with functionality to restrict access based on origination address;
in response to receiving the one or more messages from the authentication server, establishing communication with the device associated with the authenticated remote user, wherein said establishing communication is performed based on the origination address;
starting a timer which counts an amount of time that connections from the device associated with the authenticated remote user are allowed;
at a first time, enabling relaying of data between the at least one premise device and the device associated with the authenticated remote user while the timer is active, wherein relaying of data between the at least one premise device and the device associated with the authenticated remote user comprises communicating with the at least one premise device over a local area network and performing address translation such that the connection from the device associated with the authenticated remote user appears to the at least one premise device originate with the security device; and
at a second time, disabling relaying of data between the at least one premise device and the device associated with the authenticated remote user.

18. The method of claim 17, wherein said disabling relaying of data between the at least one premise device and the device associated with the authenticated remote user is performed in response to the authentication server providing a message indicating termination of the remote access session.

19. The method of claim 17, wherein said enabling relaying of data between the at least one premise device and the device associated with the authenticated remote user is limited to only a specified one or more premise devices coupled to the security device.

20. The method of claim 17,
wherein the one or more messages from the authentication server are received over an internet connection, and
wherein said establishing communication between the at least one premise device and the authenticated remote user is performed over the internet connection.

* * * * *